United States Patent
Broughton

(10) Patent No.: US 9,871,977 B2
(45) Date of Patent: Jan. 16, 2018

(54) MOBILE PHOTOGRAPHY STUDIO FOR IMPROVED VEHICLE PHOTOGRAPHY SUITABLE FOR MEMORABILIA

(71) Applicant: Daniel P. Broughton, Mesa, AZ (US)

(72) Inventor: Daniel P. Broughton, Mesa, AZ (US)

(*) Notice: Subject to any disclaimer, the term of this patent is extended or adjusted under 35 U.S.C. 154(b) by 0 days.

(21) Appl. No.: 15/087,911

(22) Filed: Mar. 31, 2016

(65) Prior Publication Data
US 2017/0180696 A1 Jun. 22, 2017

Related U.S. Application Data

(60) Provisional application No. 62/270,620, filed on Dec. 22, 2015.

(51) Int. Cl.
| | | |
|---|---|---|
| H04N 9/74 | (2006.01) | |
| H04N 5/235 | (2006.01) | |
| G06Q 30/06 | (2012.01) | |
| H04N 1/00 | (2006.01) | |

(52) U.S. Cl.
CPC ....... *H04N 5/2354* (2013.01); *G06Q 30/0621* (2013.01); *H04N 1/00289* (2013.01)

(58) Field of Classification Search
CPC ......... H04N 9/74; H04N 5/2354; H04N 9/646
See application file for complete search history.

(56) References Cited

U.S. PATENT DOCUMENTS

| | | | | |
|---|---|---|---|---|
| 9,025,029 B2* | 5/2015 | Choi | ...................... | H04N 5/217 348/148 |
| 2007/0057815 A1 | 3/2007 | Foy et al. | | |
| 2007/0098368 A1 | 5/2007 | Carley et al. | | |
| 2009/0160930 A1* | 6/2009 | Ruppert | ................ | G06T 1/0007 348/37 |
| 2010/0296801 A1 | 11/2010 | Lane | | |
| 2011/0242322 A1 | 10/2011 | O'connell | | |

(Continued)

FOREIGN PATENT DOCUMENTS

| | | |
|---|---|---|
| CN | 204641506 | 9/2015 |
| DE | 202014104257 | 9/2014 |

(Continued)

OTHER PUBLICATIONS

How to Setup a Photo Booth to Sell More Cars, Author: Korey Bachelder, Publication Date: Feb. 20, 2015, Accessed Website: http://motorlot.com/how-to-setup-a-photo-booth-to-sell-more-cars/.

(Continued)

*Primary Examiner* — Padma Haliyur
(74) *Attorney, Agent, or Firm* — Mark V. Loen

(57) ABSTRACT

The embodied invention is a multi-step process that creates a memorabilia item of a vehicle that is at a local gathering or event. The invention includes a mobile photographic studio that is adapted for use in an environment such as a 'parking lot', or 'grass field', or indoor facility environment. The mobile photographic studio utilizes tents with special controlled lighting and photographic enhancing features that which control the lighting and reflectivity of unwanted images of the vehicle. The overall process includes transmitting a raw vehicle photograph to a post processing methods system that removes any minor issues. Finally, the photograph is incorporated in a memorabilia item that is sold to a customer.

5 Claims, 3 Drawing Sheets

(56) References Cited

U.S. PATENT DOCUMENTS

Figure 1:
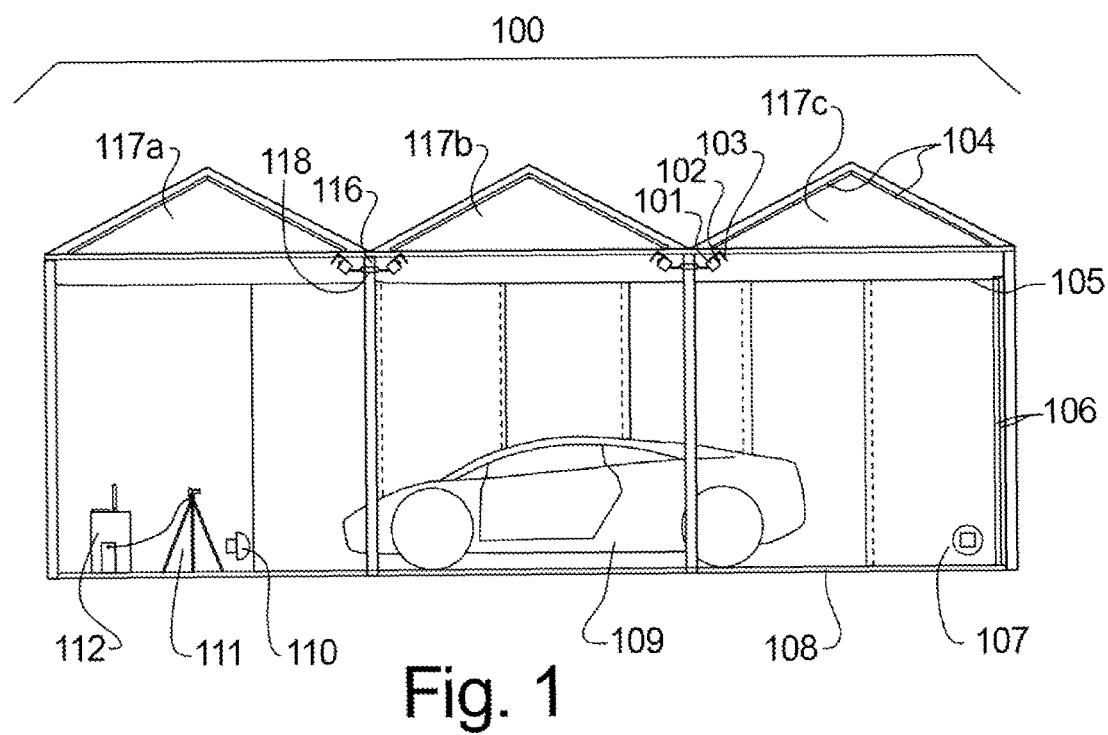

| | | | |
|---|---|---|---|
| 2014/0108400 A1* | 4/2014 | Castineiras | G06Q 50/01 |
| | | | 707/736 |
| 2014/0268627 A1 | 9/2014 | Contreras, Jr. | |
| 2015/0227028 A1 | 8/2015 | Ley et al. | |
| 2015/0339624 A1 | 11/2015 | Lozito | |

FOREIGN PATENT DOCUMENTS

| | | |
|---|---|---|
| FR | 2725410 | 4/1996 |
| JP | 2015173448 | 10/2015 |
| WO | 2015139625 | 9/2015 |

OTHER PUBLICATIONS

Headshot Truck, Accessed Date: Dec. 3, 2015, Accessed Website: http://www.theheadshottruck.com/about/.

Unique Photo Booth Business Ideas, Accessed Date: Dec. 3, 2015, Accessed Website: http://me-vis.com/7-unique-photo-booth-businesses/.

Autoexact New Patented Vehicle Photo Studio Booth, Publication Date: Jun. 16, 2014, Author: Jay Smithweck Accessed Website: https://www.youtube.com/watch?v=BDYQj37t7GE.

The Best in Automotive Presentation, Accessed Date: Dec. 3, 2015, Accessed Website: http://web.autoexact.com/PhotoBooth.aspx.

* cited by examiner

MOBILE PHOTOGRAPHY STUDIO FOR IMPROVED VEHICLE PHOTOGRAPHY SUITABLE FOR MEMORABILIA

CROSS REFERENCE TO RELATED APPLICATIONS

This application claims the benefit of U.S. provisional application No. 62/270,620 filed on Dec. 22, 2015. The entire provisional application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward photography studios, and in particular, special portable studio arrangements suitable for high quality pictures. Additionally, the studio design is adapted to create attractive pictures in an environment with a high throughput of differing vehicles to be photographed.

(2) Description of Related Art

It is a common human need to take photographs for personal records of life experiences and to take photographs of important events in life. To that end, it is common for individuals to photograph personal items for fun and post their pictures on social media. A picture creates good memories and when that picture is viewed later, the memory of the person, event, or item is more vividly recalled.

To meet this need, it is common for vendors to sell memorabilia items such as printed T shirts, jerseys, jackets, hats, key chains, cups, socks, coffee mugs, notebooks, collectable cards, mouse pads, etc. that have a picture, a message, or a logo at concerts or sporting events. There is a lot of enthusiasm in the public to support this kind of commercial activity as evidenced by memorabilia sales. Total revenue generated from sports merchandising in North America in the year 2013 is reported to be over $13 billion.

Individuals who are car, truck, and motorcycle enthusiasts attend important events, such as shows, meets, swaps, club meetings, and various nationwide gatherings. Maintaining and restoring old cars draws many into an absorbing hobby and requires a significant investment in time and money. The ability to show a car they have worked on is a particular source of enjoyment. An individual who restores a car (or other vehicle) has put a significant amount of time in it. When an individual attends such events with their restored vehicle, it is highly desirable to take a picture for the memory with a personal camera. However, the results of the picture are usually filled with defects which lowers the appeal of displaying the picture. Unwanted reflections in the windows, poor lighting on the vehicle paint, unwanted people around the car, and other problems can create an unappealing picture.

In particular, automobiles have many shiny surfaces at various angles, and metallic surfaces that are highly reflective. They also have glass surfaces that are semi-mirror like, and flat surfaces like tires. The combination of different surfaces is difficult to photograph well, and require a controlled environment so that vehicle surfaces do not reflect or show lighting and background images surrounding the car. Also, different vehicles have different surface angles and it is difficult to establish a method of taking pictures in a typical photography studio.

It is desirable that any vehicle picture uses a high quality photograph, and creates a happy memory of the event. It is also desirable for the picture to be incorporated in a logo or other art from the event. It is additionally desirable to attractively display the vehicle when it is in a 'show ready' state in a memorabilia format.

To create a quality picture, the need to control the light and surroundings around the vehicle is a significant challenge. In consideration of the number of surface angles and reflectivity of the vehicle, as a practical matter it is impossible to completely eliminate unwanted reflections. There is a need for a portable photographic studio that is designed to effectively control the lighting and the environment around the vehicle. Additionally, there is a need to post process the picture to remove minor defects. It is highly desirable to minimize the amount of post processing needed. Additionally, there is a clear need in the market to display vehicles in a picture format in a way that enhances the pride of ownership.

BRIEF SUMMARY OF THE INVENTION

The embodied invention is a multi-step process that creates a memorabilia item of a vehicle that is photographed at a local gathering or event. The invention includes a mobile photographic studio that is adapted for use in an environment such as a parking lot, grass field, or indoor facility. The mobile photographic studio utilizes tents with controlled lighting and photographic enhancing features which control the lighting and reflectivity of unwanted images on the vehicle. The overall process includes transmitting a raw vehicle photograph to a post processing system that removes minor issues. Finally, the photograph is incorporated in a memorabilia item that is sold to a customer.

BRIEF DESCRIPTION OF THE SEVERAL VIEWS OF THE DRAWING(S)

Figure 2:
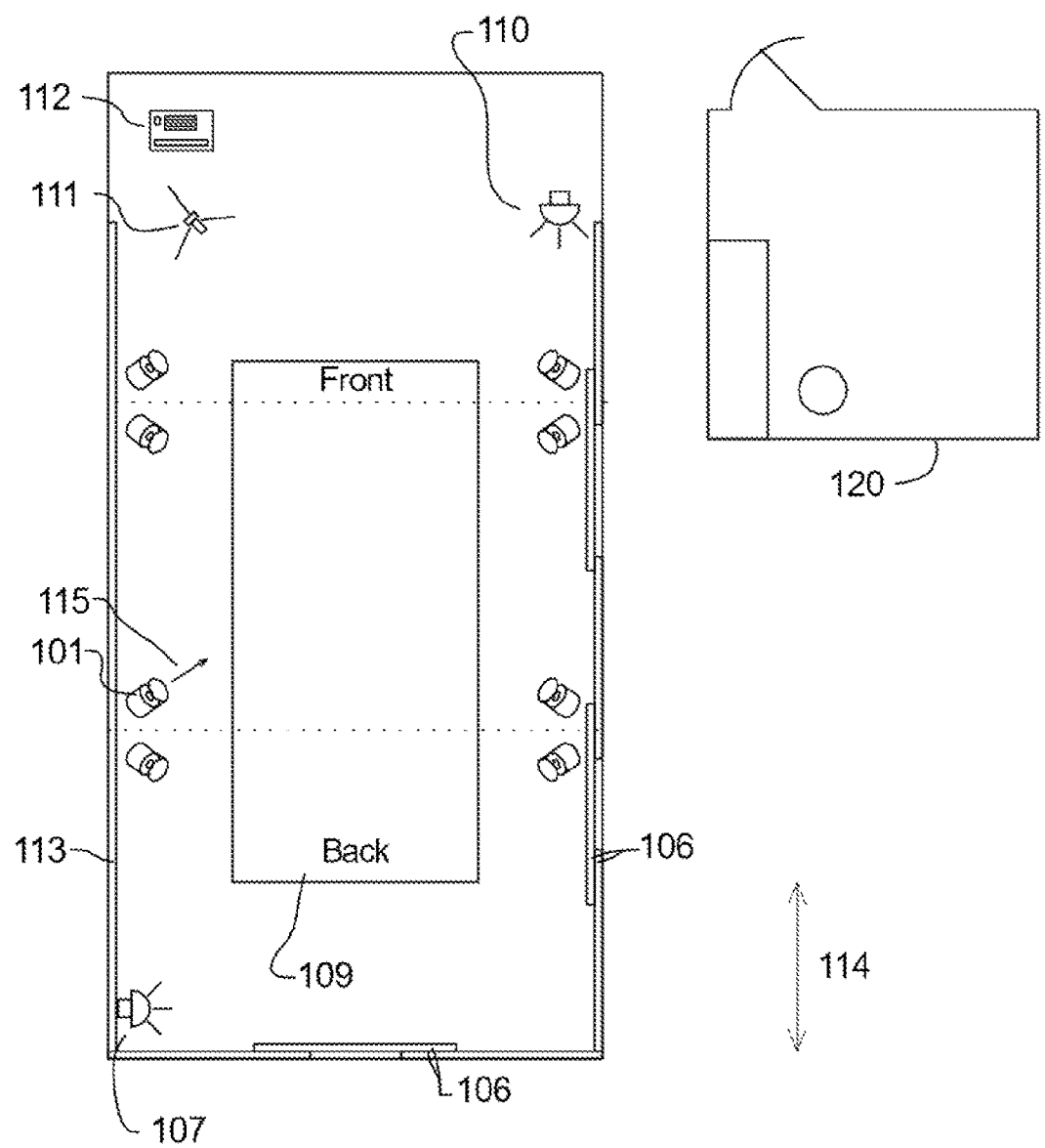
Figure 3:
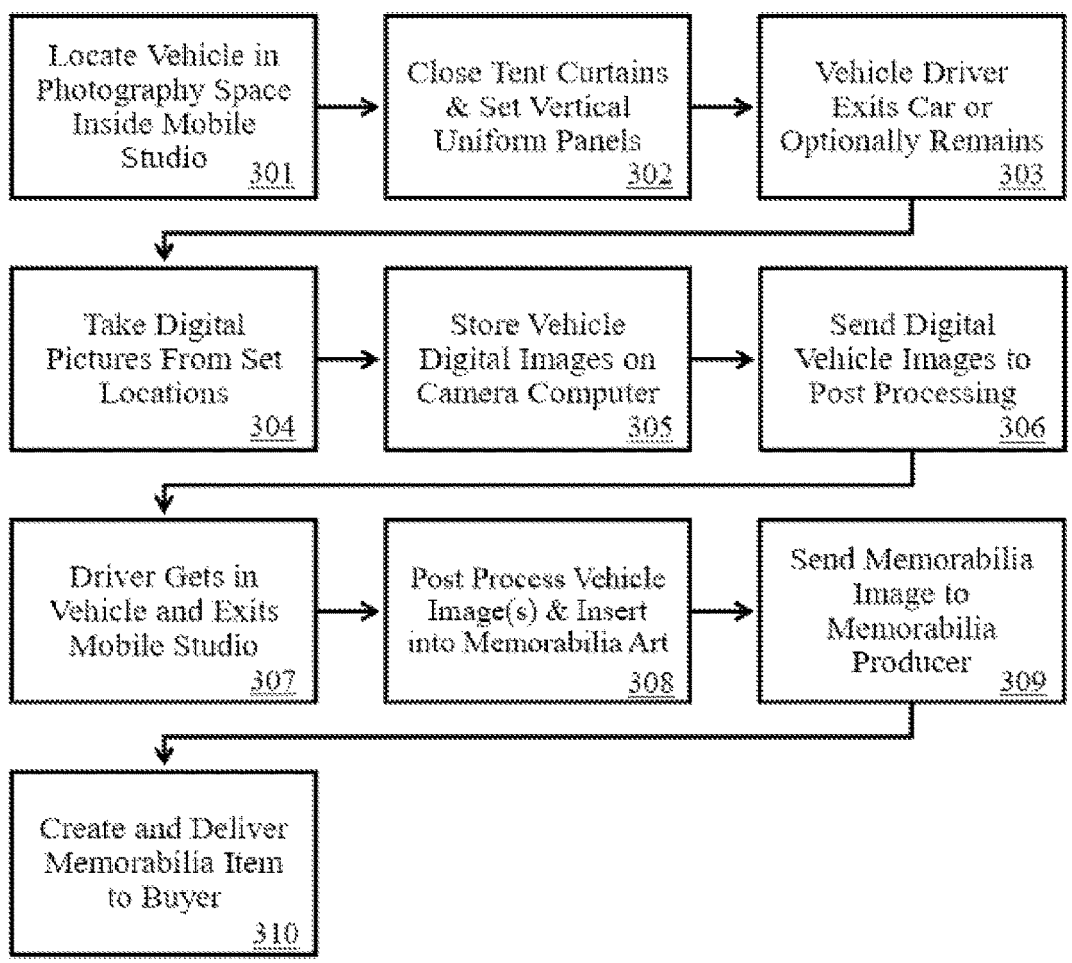

FIG. 1 is a side view of the portable studio.
FIG. 2 is a top view of the portable studio and sales office.
FIG. 3 shows steps used to create a memorabilia item.

DETAILED DESCRIPTION OF THE INVENTION

In the current embodied invention, the mobile photographic studio utilizes a mobile structure that is deployed at a photography site. For example, the mobile structure could comprise three adjoining and connected tents. A portable plywood floor in the color of green is used on the bottom of the mobile photographic studio. The painted flooring provides a uniform color for picture taking purposes, and additionally, provides structural support for the tents in the case of inclement weather. The floor weight is approximately 700 lbs., and the floor weight provides an anchor for the tent poles which are securely connected to the floor.

The green floor color is only one embodiment. The color could equally be black or white.

It is most helpful to post picture processing for the floor to be a uniform color and is chosen to match the walls/picture panels of the vehicle tent.

The photography space inside the tent, that is, the portion of the three adjoining tents that is used to take the picture of the vehicle, is approximately 30 feet long×15 feet wide.

In one important embodiment, the mobile photographic studio is designed to take pictures of vehicles as part of an event, gathering, or show. The event organizer could promote the mobile studio with a suitable financial arrangement between a photographer and the organizing company.

In a preferred embodiment, the mobile photographic studio is designed to photograph at least 25 vehicles per hour, and the design of the three adjoining tents is chosen so that the cars enter at one end and exit at the other. The combination of tents provides four outer walls, two of which allow the vehicle to conveniently enter and exit by driving in a single direction. This facilitates good vehicle movement and allows for a lineup of vehicles to que at the entry end of the mobile studio. To facilitate vehicle movement, the tent walls are easily pushed aside or opened. Once a vehicle enters the photography area of the tent arrangement, the tent sides can be closed to exclude outside lighting. Once the vehicle is spotted in place by the photographer (or assistants), uniform colored panels are strategically placed around the vehicle based on the line of sight of the digital camera.

FIGS. 1 and 2 show a mobile photographic studio 100 that is used for taking high quality pictures of a vehicle 109 to be photographed. To control the flash lighting for the picture, eight upper camera flashes 101 are used to take the picture, and additionally, two lower camera flashes—a back flash 107 and a front side flash 110 are used. To improve diffusion and avoid lighting 'hot spots' from the flashes, the upper camera flashes 101 are mounted/clamped 118 on the tent support structure 116. A bulb diffuser 102 that covers the bulb and a round diffusing plate 103 spreads the light over the upper tent area 117a,b,c. Upper diffusing panels 104 additionally spread the light over the upper tent area, and a diffusing material 105 above the vehicle is used. Preferably, the diffusing material 105 is white in color. The camera flashes 101 are oriented 115 so that each flash is directed toward the peak and center of the upper tent area 117a,b,c where the respective camera flash is located. The end result is a diffuse flash lighting above the vehicle that minimizes light reflection off of the vehicle.

When taking pictures of a high number of vehicles in a day, it is preferable that any camera flashes are plugged directly into power rather than use a battery.

Vertical uniform color panels 106 are situated around the vehicle to create a background in the photograph in a manner so that the vehicle can be digitally isolated in the picture. Painted floor panels 108 under the vehicle extend to the edges of the vertical uniform color panels. On the driver's side of the vehicle, a single (or multiple) vertical diffusing reflective panel(s) 113 are used to improve the lighting on the camera side of the vehicle. The reflective panels are made from a diffusing foil over a foam insulation, which includes a small pattern that makes it highly reflective, but diffuse. This provides important lighting in the lower portion of the vehicle and aids in providing a visual contrast to the painted floor. In a preferred embodiment, the reflective panel(s) is made from the same material as the upper diffusing panels 104. In one embodiment of the invention, the reflective panel(s) are made from Reflectix® insulating foam.

In a preferred embodiment, the vehicle is centered from left to right in the mobile studio as viewed in FIG. 2, but this is not a strict requirement. Additionally, the back of the vehicle is located 114 substantially three feet from the tent entry side.

A high resolution, digital camera 111 takes a vehicle digital image, and preferably, more than one digital image. It is desirable that the camera has a good quality lens and a low noise image sensor; as well as being a high resolution camera. In a preferred embodiment the digital camera has at least 10 megapixels of resolution in the digital image and utilizes a high resolution format.

The digital camera is connected to a camera computer station 112, and after the digital camera takes the vehicle digital image in a high resolution format, it is immediately sent to the camera computer station. It is preferable to communicate between the digital camera and the camera computer station using a high resolution format, such as RAW. A camera RAW image file contains minimally processed data from the image sensor of a digital camera. RAW files can be imported into many types of post processing software.

After the vehicle digital image is taken, the photographer looks at the picture in a computer display and verifies that the picture is satisfactory. The photographer then moves the camera around to various positions and takes additional vehicle digital images as needed for any memorabilia items. Typically, a minimum of two vehicle digital images are taken in perspective view. Many other vehicle digital images can be taken, but it is preferable to simplify the photography session to a limited number of vehicle digital images that will match the vehicle size and perspective to different memorabilia formats.

It has been found that visually pleasing memorabilia items are obtained when the camera elevation is approximately the same as the elevation of the driver's eyes when driving the vehicle. This camera elevation is a preferred embodiment.

After the vehicle digital images have been taken, the tent ends (movable walls) are opened for the vehicle to leave and allow the next one to enter. The vehicle is carefully driven out of the mobile studio and next one is directed into the photographic space. The vertical uniform color panels at the entry end of the tent are also moved as needed to allow the next vehicle to enter the mobile studio.

The photographed vehicle is parked in a parking area and a buyer of memorabilia enters into a sales tent 120 or sales office. In the sales office, the buyer is shown various memorabilia to purchase and a sale is then completed. The name of the buyer and identifying information is recorded, such as a phone number, email, or mailing address, and matched to the vehicle digital images that were taken. The buyer completes the sales transaction via a credit, debit, cash, or other payment method.

In spite of the best effort to make the lighting uniform in the mobile studio, various vehicles have different reflecting angles and pick up undesirable reflected imperfections. To improve image quality, the vehicle digital images are sent from the camera computer to post processing software, such as Adobe Photoshop©, when used by an operator, improves the picture by removing any defects. The transmission from the camera computer can be via an internet connection to a private website, via a hand carried portable hard drive, or by other electronic file transfer means. It is important that the file transfer happen in a timely manner without loss of image fidelity.

Post processing the digital image of the vehicle eliminates and rectifies minor color reflections on the paint, chrome, and windows; and post processing will also eliminate minor light reflections that are too shiny. Such defects cause the vehicle's color to appear less visually appealing. An important purpose of the mobile studio is to minimize the need for post processing. This facilitates low labor cost to create an image that will be visually pleasing.

The post processing process that is used to create a memorabilia image includes any one of the following items:
1. isolating the vehicle by erasing the vertical uniform color panels and the uniform color floor.
2. re-coloring mis-colored areas (usually due to reflections) to match the rest of the vehicle.
3. deletion or modification of the vehicle windows (i.e. create transparency) to allow background art to at least partially show through.
4. positioning of the vehicle on the memorabilia art.

The memorabilia art can be a variety of backgrounds. For example, a vehicle can be inserted into a gas station background or a sunset background. When the corrected vehicle image is inserted into the memorabilia art, it is preferable that the positioning is based on a positioning standard so that the memorabilia picture does not need to be repeatedly tweaked and is ready as soon as possible.

In one embodiment of the invention, the memorabilia image with the included vehicle image is sent to an outside memorabilia producer via an internet/website interface. The memorabilia producer then prints the memorabilia art on the memorabilia item offsite, and delivers it to the buyer address through a mail delivery service. This method provides for a less complicated mobile studio/photography site arrangement. The memorabilia production equipment (i.e. printers, laminators, inventory, etc.) is conveniently and economically located at a permanent location. However, this is not a strict requirement.

In another embodiment, the memorabilia item is created on site by the company who takes the vehicle image and hands it to the buyer the same day the vehicle digital image is taken. Alternately, the memorabilia item is sent to the buyer on a subsequent date.

In another embodiment, the vehicle digital images made during a photographic session are collected and stored on electronic storage media (flash drives, portable hard drives, and the like) and then sent/delivered at a later time to post processing.

The positioning of the vehicle in the portable studio is done by the photographer and an optional helper. Floor marks are used to guide the vehicle into position in the photography space. The vehicle driver then gets out of vehicle for picture to be taken, unless the vehicle driver desires to be in the picture.

In a preferred embodiment, the vehicle windows are up, but this is not required. For example, a convertible car would often be better photographed with the top and windows down. Normally it is better for the windows to be up to simplify digitally removing/altering them in post processing. This will allow any background in the memorabilia art to show through, and create a more realistically pleasing picture.

It is preferable for the vehicle to be immediately picture ready. It is undesirable for the vehicle owner to prepare the vehicle for a photograph in the mobile studio by cleaning or buffing the vehicle while there is a line of cars waiting.

It has been found that it is preferable for the vertical uniform color panels to be illuminated with diffuse light. By illuminating the panels, the panels are a uniform color without dark shadows that might be created during a photographic flash. This greatly aids in digitally extracting the vehicle image from the studio background. Dark shadows in the panels create a varied color background which is more difficult to delete in post processing.

Additionally, for similar reasons, it is preferable that the vertical uniform panels are wrinkle free. Depending upon the wrinkle type/depth/location, the dark wrinkle areas can be a frustrating post processing nuisance.

It may be desirable, in some conditions, to utilize a vertical uniform colored cloth instead of vertical uniform color panels. In this case, the vertical uniform colored cloth is preferably wrinkle free. The wrinkle free condition can be achieved with a weighted lower bar that creates the needed tension in the material to eliminate wrinkles.

The uniform vertical color panels can be created from a suitable, light weight material, and covered with cloth or felt that is uniform in color. If needed, it is preferable to reinforce the panel with light weight tubing, such as a glued 1"×1" extruded aluminum tubing on the back. This aids in keeping the background panels stiff and uniform when subject to field conditions. Various stiffening arrangements could be equally employed, and a rectangular aluminum tubing frame attached to the panel back was found to be sufficient. The fiber board can be made from MDF or a material that is commonly used for signs.

FIG. 3 is a summary of important steps to creating a memorabilia item
1. Locate Vehicle in Photography Space Inside Mobile Studio 301
2. Close Tent Curtains & Set Vertical Uniform Panels 302
3. Vehicle Driver Exits Car or Optionally Remains 303
4. Take Digital Pictures from Set Locations 304
5. Store Vehicle Digital Images on Camera Computer 305
6. Send Digital Vehicle Images to Post Processing 306
7. Driver Gets in Vehicle and Exits Mobile Studio 307
8. Post Process Vehicle Image(s) & Insert into Memorabilia Art 308
9. Send Memorabilia Image to Memorabilia Producer 309
10. Create and Deliver Memorabilia Item to Buyer 310

As used herein the term camera computer is intended to refer to a computer-related entity, comprising either hardware, a combination of hardware and software, software, or software in execution capable of performing the embodiments described. The disclosed embodiments which use the camera computer refer to being interfaced to and controlled by a computer readable storage medium having stored thereon a computer program. The computer readable storage medium may include a plurality of components such as one or more of electronic components, hardware components, and/or computer software components. By way of example, such electronic components include a central processing unit, random-access memory (RAM), read-only memory (ROM), erasable programmable read-only memory (EPROM), electrically erasable programmable read-only memory (EEPROM), field programmable gate array (FPGA), flash memory, compact disk, or other optical disk storage, magnetic disk storage or other magnetic storage devices, or any other medium which can be used to carry or store desired program code in the form of computer-executable instructions or data structures and which can be accessed by a general-purpose or special-purpose computer. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not list may be employed with the disclosed embodiments.

A number of such components can be combined or divided in an implementation of a computer system. Further, such components may include a set and/or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A method of creating a memorabilia item for a vehicle comprising:
   a. providing:
      i. said vehicle,
      ii. a digital camera, wherein said digital camera is capable of taking high resolution images of said vehicle,
      iii. a mobile studio comprising:
         1. four outer walls, wherein two parallel walls of said outer walls open for vehicle movement,
         2. a uniform colored floor,
         3. uniform colored panels surrounding said vehicle according to line of sight of said digital camera,
         4. controlled flash lighting, wherein said controlled flash lighting incorporates:
            a. a diffuse camera flash from above said vehicle,
            b. a diffuse camera flash along a driver's side of said vehicle,
            c. a diffuse camera flash along said uniform colored panels behind said vehicle,
         5. a camera computer, wherein said camera computer is configured to receive digital images of said vehicle from said digital camera,
   b. locating said mobile studio at a photography site,
   c. driving said vehicle into said mobile studio and positioning said vehicle inside said mobile studio,
   d. obtaining at least one still digital image of said vehicle by use of said digital camera and by use of said controlled flash lighting,
   e. image post processing said at least one digital image of said vehicle to create a memorabilia image by:
      i. creating an isolated vehicle image of said vehicle by erasing said uniform colored panels and said uniform color floor from said at least one digital image,
      ii. re-coloring mis-colored areas on said isolated vehicle image,
      iii. positioning said isolated vehicle image on a memorabilia art image,
      iv. optionally modifying any window of said isolated vehicle image to allow said memorabilia art image to be at least partially visible, and
      v. combining said isolated vehicle image and any said memorabilia art image together,
   f. using memorabilia production equipment to create a memorabilia item using said memorabilia art image,
   g. sending said memorabilia item to a purchaser's address, and
   h. wherein said mobile photographic studio is designed to photograph at least 25 vehicles per hour.

2. The method according to claim 1 wherein the positioning of said vehicle inside said mobile studio is based on floor markings.

3. A method of creating a memorabilia item for a vehicle comprising:
   a. locating said vehicle inside a mobile studio, wherein said mobile studio is enclosed by four movable walls, wherein two parallel walls of said four movable walls open for vehicle movement,
   b. surrounding said vehicle with vertical uniform colored panels and a uniform color floor,
   c. taking at least one still digital image of said vehicle using diffuse lighting,
   d. storing said still digital image on a camera computer,
   e. image post processing said still digital image of said vehicle to create a memorabilia image by:
      i. creating an isolated vehicle image of said vehicle by erasing vertical said uniform colored panels and said uniform color floor from said still digital image,
      ii. re-coloring mis-colored areas on said isolated vehicle image,
      iii. positioning said isolated vehicle image on a memorabilia art image,
      iv. optionally modifying any window of said isolated vehicle image to allow said memorabilia art image to be at least partially visible, and
      v. combining said isolated vehicle image and said memorabilia art image together,
   f. sending said memorabilia image to a memorabilia producer,
   g. creating and delivering said memorabilia item to a buyer, and
   h. wherein said mobile studio is designed to photograph at least 25 vehicles per hour.

4. The method according to claim 1 wherein said at least one still digital image of said vehicle matches size and perspective of different memorabilia formats.

5. The method according to claim 1 wherein said camera elevation substantially matches an elevation of said vehicle driver's eye elevation.

* * * * *